Patented Jan. 5, 1937

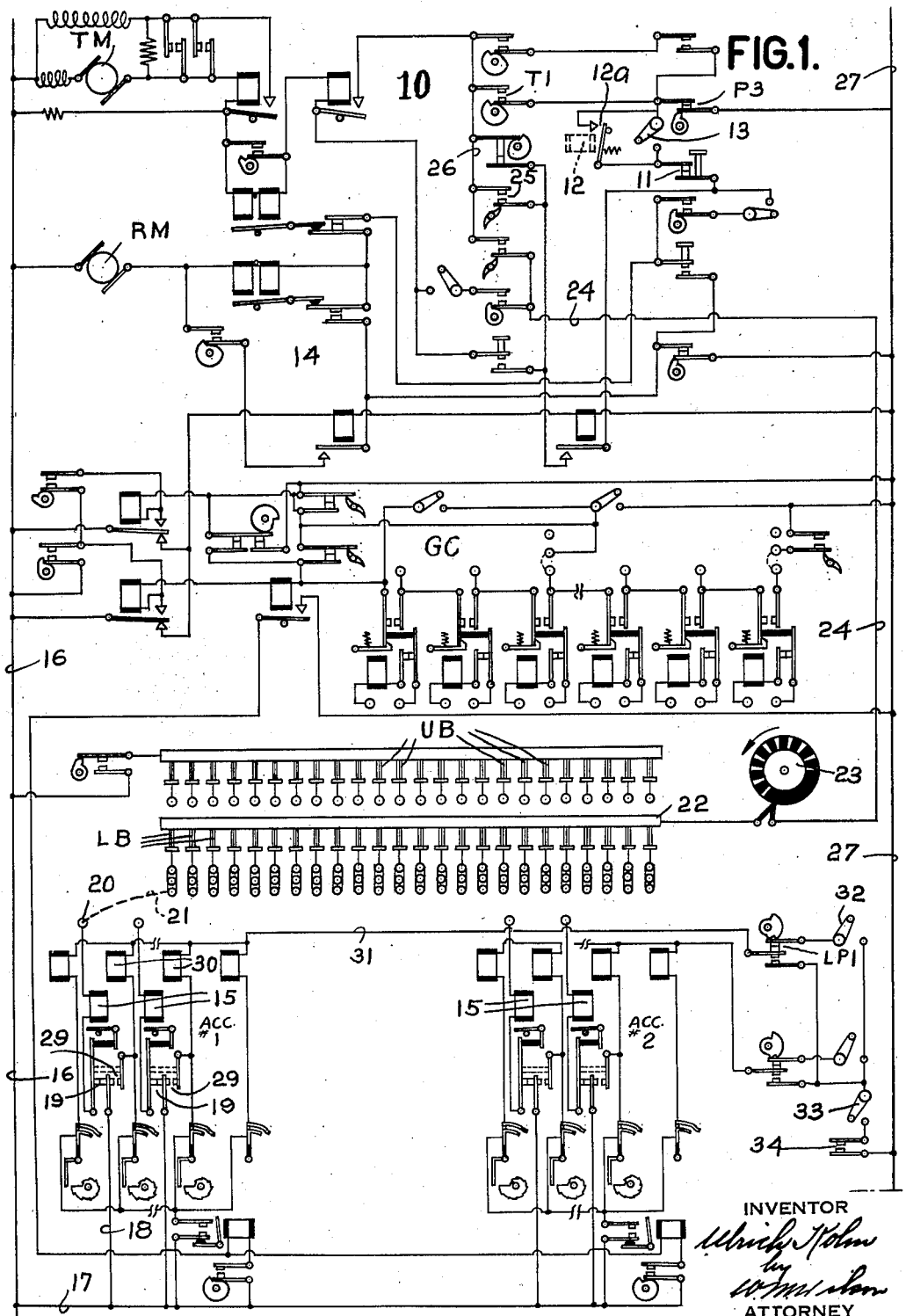

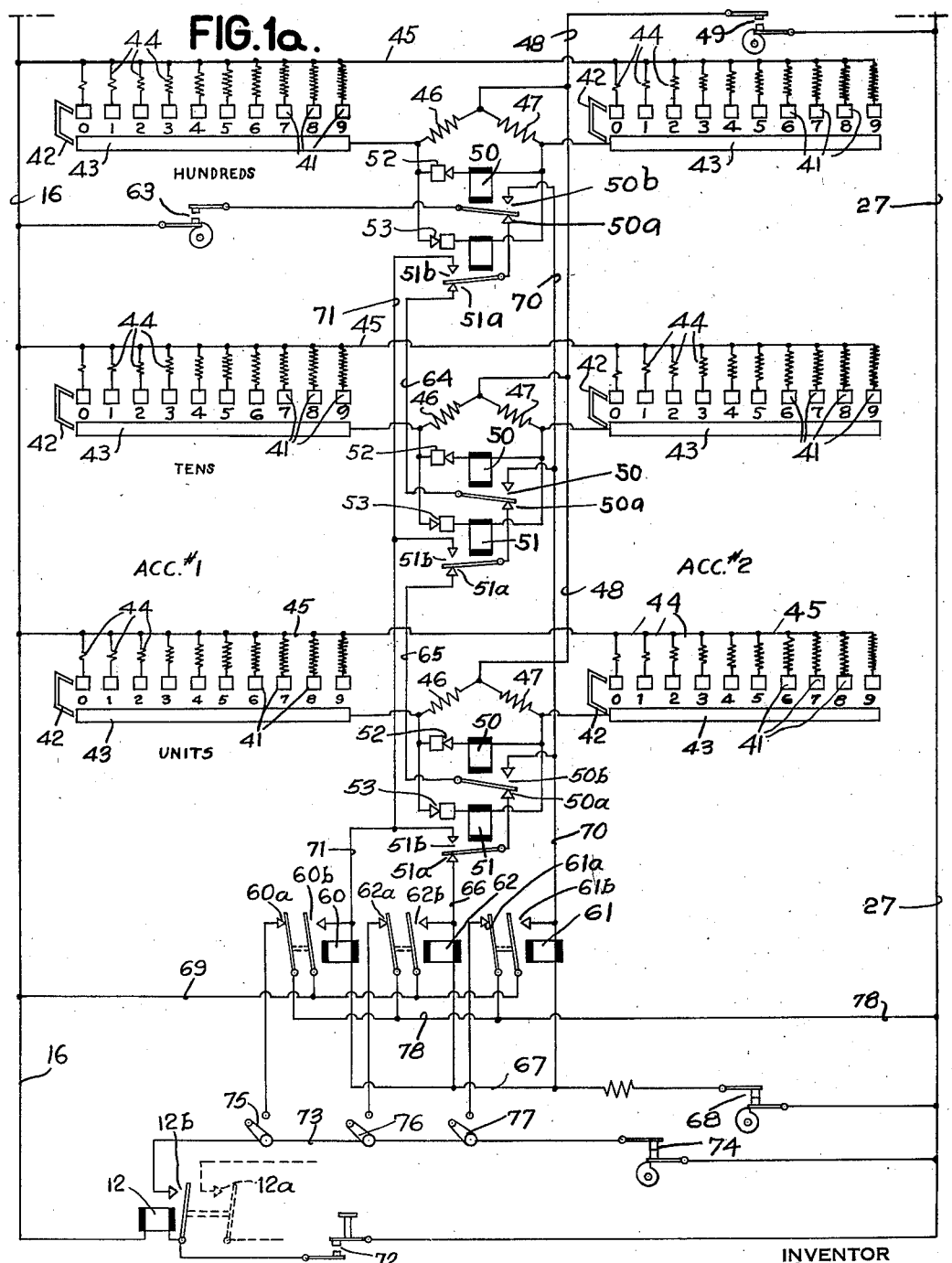

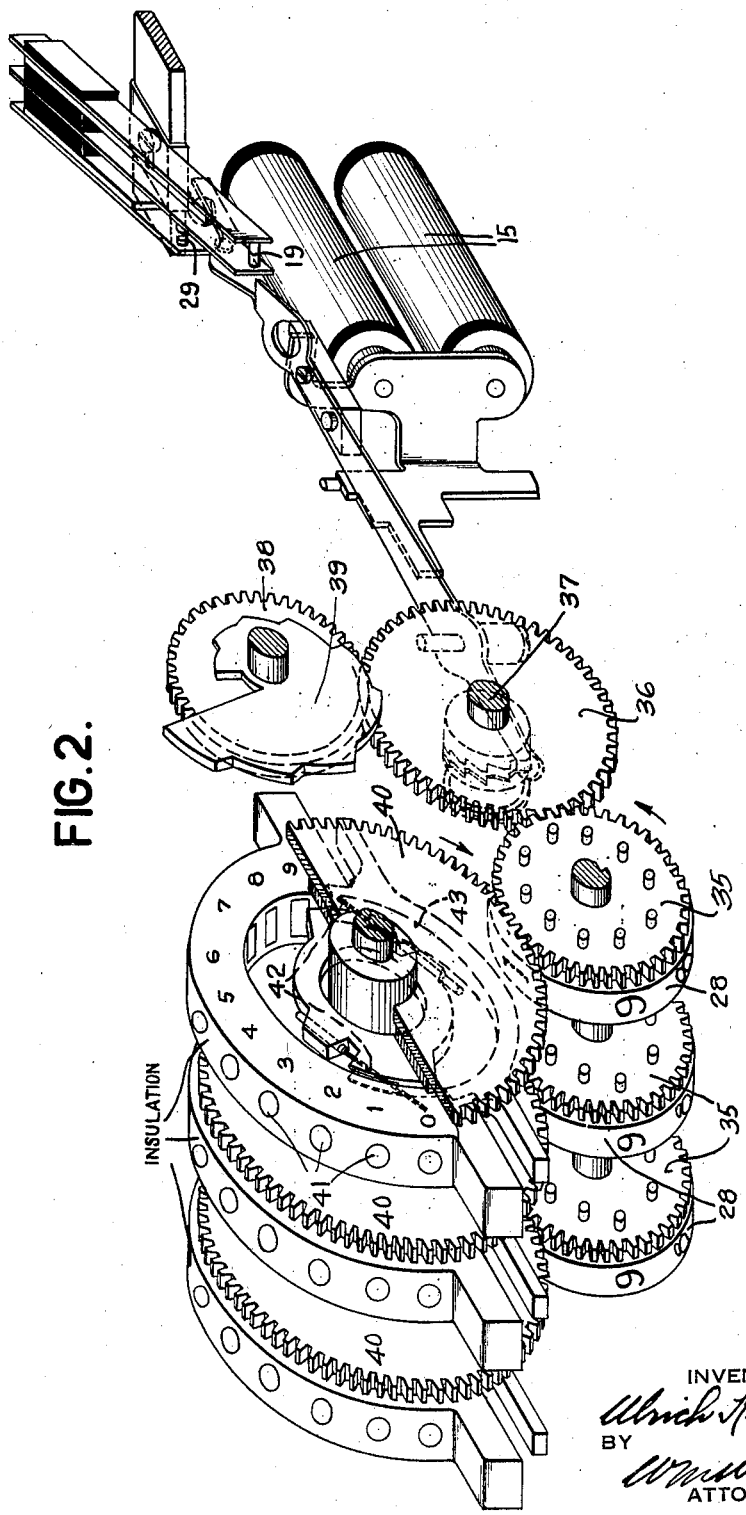

2,066,783

UNITED STATES PATENT OFFICE 2,066,783

TABULATING MACHINE

Ulrich Kölm, Berlin, Germany, assignor to International Business Machines Corporation, New York, N. Y., a corporation of New York Application October 14, 1933, Serial No. 693,548
In Germany February 14, 1933

7 Claims. (Cl. 235—92)

This invention relates to accounting machines and more particularly to accounting machines of the record controlled tabulator type. In certain classes of work, separate classification data are separately accumulated and it is frequently desirable to determine the relationship existing between the accumulations. For instance, in handling certain types of accounts, a record card may indicate by perforations therein an amount credited and other cards may record smaller amounts debited as payments on an initial loan. In the event of an overdraft, the sum of the debits will exceed the initial credit.

The present invention provides for initially entering the credit amount from its cards into an accumulator and for thereafter entering the debit amounts in succession into another accumulator. Means is provided for making a comparison between the settings of the two accumulators after each entry and for interrupting the operation of the machine if an overdraft is detected.

The present invention has for its principal object, therefore, the provision of devices for comparing settings of a pair of entry receiving devices after each entry and for controlling further machine operation in accordance with the result of the comparison.

According to another feature of the invention the same comparing devices may be effective to stop the machine when the amount in both accumulators is the same, indicating that the particular account is balanced.

The broad aspects of the invention are disclosed in my copending application Ser. No. 625,747, filed July 29, 1932, wherein I have shown mechanism for comparing the setting of two accumulators during total taking operations, whereas, in the present embodiment, comparison takes place after each item entry.

Various other objects and advantages of the invention will be obvious from the following particular description of one form of mechanism embodying the invention or from an inspection of the accompanying drawings; and the invention also constitutes certain new and novel features of construction and combination of parts hereinafter set forth and claimed.

Figs. 1 and 1a taken together form a wiring diagram of the electric circuits of the machine.

Fig. 2 is a detail in perspective of a single order of one of the accumulators showing the comparing commutator devices.

The invention may be applied to the type of electric tabulating machine disclosed in Patent No. 1,762,145, issued to G. F. Daly and R. E. Page, June 10, 1930 and also in Patent No. 1,822,594, issued to C. D. Lake, September 8, 1931. As machines of this type are well known, a detailed description thereof need not be made herein, other than to briefly outline the general operation of the machine to show how entries are effected in the accumulators, which entries are to be compared with one another by means of the present invention.

The diagram (Fig. 1) is similar to that shown in the Daly and Page patent previously referred to. During adding operations, the machine is driven by a tabulating motor TM controlled by a group of cam and relay controlled circuits indicated at 10. The circuit through motor TM extends through the usual stop key contacts 11 which upon opening interrupt the motor circuit and cause stopping of the machine. For the purposes of the present invention, a pair of relay contacts 12a are included in series with the stop key contacts, but may be shunted out by closure of a switch 13. Contacts 12a are controlled by a magnet 12 which holds contacts 12a closed and thereby permits the completion of the motor circuit. Deenergization of magnet 12 under control of the comparing devices to be described will allow contacts 12a to open and interrupt further machine operation.

When the tabulator motor TM is in operation, it feeds the perforated tabulating cards, bearing differentially arranged index points representing digits, first, beneath the upper analyzing brushes UB and exactly one machine cycle later, beneath the lower analyzing brushes LB. By means of the group control mechanism indicated generally at GC, groups of cards as represented by the same data entry in certain selected card columns, may be operated upon separately, the items of each group being accumulated and the total of them taken before the machine begins operation on the following card group. During total taking operations the machine is driven by reset motor RM controlled by a group of circuits, contacts and relays designated generally at 14.

As the perforated cards pass the lower brushes LB their index points instantaneously close circuits through the proper lower analyzing brushes LB to energize counter magnets 15 (see also Fig. 2). A representative adding circuit may be traced as follows: from left side of line 16, wire 17, wire 18, normally closed contacts 19 of Acc#1, adding magnet 15, plug socket 20, plug connection 21, lower brush LB, perforation in the record card, lower brush common 22, impulse distributor 23, wire 24, lower card lever contacts 25, wire 26, cam contacts T1 and P3 to right side of line 27. As usual, the timed energizations of the magnets 15 control mechanisms for entering the data corresponding to the card reading on the counter wheels 28 (Fig. 2).

When any adding magnet 15 is energized, it causes contacts 29 (Fig. 1) to close, energizing a printer magnet 30 to select the type corresponding to the entered item, for printing. A representive circuit may be traced as follows: from left side of line 16, wires 17, 18, contacts 29, magnet 30, wire 31, upper contacts LP1, switch 32 (closed if listing is desired), switch 33, contacts 34 (closed during printing operations) and thence to right side of line 27. In this fashion the accumulated items may be listed. These functions do not enter specifically into the present invention and will not be described in detail as they are well understood and fully described and explained in the patents previously mentioned.

Referring now to Fig. 2, the accumulator wheels 28 are integral with gears 35 driven by gears 36 carried by a shaft 37 and driven therefrom under control of the adding magnets 15 as previously stated. As usual the accumulator wheels 28 are provided with indications so that the data entered thereon may be visually indicated. Also driven from the gear 36 is a gear 38 of which one is provided for each accumulator wheel 28. Attached to each gear 38 is the usual stepped cam 39 provided with ten steps, one for each of the ten positions which the indicating wheel 28 may assume.

Meshing with each gear 35 is a gear 40 proportioned to make a half revolution to every complete turn of gear 35. A pair of electrically connected brushes 42 is carried by and insulated from gear 40 and is angularly displaced according to the reading on the accumulator wheel.

A number of contact segments 41 are arcuately disposed in the path of brushes 42 and correspond in number to the several indicating positions of wheel 28. One of the pair of brushes 42 will always be in contact with the segment 41 corresponding to the wheel setting and the other will contact with a common arcuate conductor 43.

In Fig. 1a is shown the comparing mechanism by means of which the objects of the invention are realized. Three denominational orders of accumulator #1 and three orders of accumulator #2 are diagrammatically illustrated by the representation of their contact segments 41 lying adjacent to the corresponding conductors 43.

Comparison is to be made between corresponding orders of the two accumulators and since all orders are similarly arranged, an explanation of one, the units order for example, will suffice for all. A resistance 44 is wired between each segment 41 and a common wire 45. The resistances in correspondingly numbered segment positions are equal in value and this value varies between adjacent segments; that is, the resistance values increase progressively from the "0" segment to th "9" segment.

The conductors 43 are connected to resistances 46 and 47 of a Wheatstone bridge arrangement which are of equal value and have their common terminals connected to a common wire 48 extending to a pair of cam contacts 49. Within a branch of the bridge are two relay magnets 50 and 51 connected in parallel and in parallel with resistances 46 and 47. Relay magnets 50 and 51 have uni-directional current flow devices 52 and 53 in series therewith, respectively. Detector 52 permits current to flow only in one direction and detector 53 permits current to flow in the opposite direction only.

Whenever the brushes 42 of the both orders stand in the same relative positions, that is, in contact with segments of like value and having the same resistance values there will be no potential difference between the outer connection of resistance 46 and the outer connection of resistance 47 and, of course, no difference in potential across relay magnets 50 and 51 in parallel therewith.

If brush 42 in an order of accumulator #1 is standing at a segment 41 of higher value than the segment upon which the corresponding order brush 42 of accumulator #2 is standing, there will be a difference in potential across resistances 46, 47 and across relays 50 and 51. With the higher resistance 44 in the circuit of the accumulator #1 brush, current will flow through relay magnet 50 causing opening of its contacts 50a and closure of contacts 50b.

Conversely, if the brush 42 of accumulator #2 is standing at a higher value segment, current will flow through relay 51, causing opening of contacts 51a and closure of contacts 51b.

These three conditions may be briefly summarized as follows for a single denominational order.

If Acc#1>Acc#2, magnet 50 is energized.
If Acc#1<Acc#2, magnet 51 is energized.
If Acc#1=Acc#2, neither is energized.

The interconnecting wiring between the relays of several orders will now be explained to show that if the setting of several orders of Acc#1 is greater than the setting of the corresponding orders of Acc#2, a relay magnet 60 will become energized. If Acc#1 is less than Acc#2, a relay magnet 61 will become energized and if the settings are alike, a third relay magnet 62 will become energized.

Examining the like condition first, it will be seen that upon closure of cam contacts 63 (Fig. 1a) in a manner to be explained, contacts of relays 50, 51 will be in the positions shown and a circuit will be traceable from line 16, contacts 63, contacts 50a in the hundreds order, contacts 51a in the hundreds order, wire 64, contacts 50a and 51a in the tens order, wire 65, contacts 50a and 51a in the units order, wire 66, magnet 62, wire 67, cam contacts 68 to line 27. Magnet 62 will thereupon close its contacts 62b to establish a holding circuit from line 16, wire 69, contacts 62b, magnet 62, wire 67, contacts 68 to line 27.

Assume now that Acc#1 is greater in its setting in the hundreds and units orders so that magnets 50 in these orders are energized and that there is equality in the tens orders. The circuit now follows from line 16, contacts 63, contacts 50b in the hundreds order, wire 70, magnet 61, wire 67, contacts 68 to line 27. A similar holding circuit through contacts 61b will maintain the magnet 61 energized.

Assume further that Acc#1 is less in its setting in the hundreds order and greater in the two lower orders so that magnet 51 in the hundreds order is energized and magnets 50 in the tens and units are energized. The circuit will then follow from line 16, contacts 63, contacts 50a and 51b in the hundreds order, wire 71, magnet 60, wire 67, contacts 68 to line 27. A holding circuit through contacts 60b will thereupon become effective.

Inspection of the circuit arrangement will disclose that the highest order will predominate in controlling when the accumulator settings differ in such order. This is due to the fact that all control circuits must pass through contacts 63 and, where there is disagreement, will be directed to wires 70 or 71 according to the conditions. Since wires 70 and 71 lead directly to their respective relays 61 and 60, the condition of relays 50, 51 in lower order will have no effect. Where there is agreement in the highest order the circuit will pass through wires 64, 65 and will be directed to wires 70 or 71 in the first order in which disagreement occurs.

It will thus be apparent that the highest denominational order will predominate in determining whether the setting of an entire accumulator is greater or less than the setting of another accumulator. These conditions may therefore be summarized as follows:

If the setting of Acc#1>Acc#2 magnet 61 is energized.

If the setting of Acc#1<Acc#2 magnet 60 is energized.

If the setting of Acc#1=Acc#2 magnet 62 is energized.

Since each order of the accumulators is provided with "0" segments with which brushes 42 normally contact, the comparison of two numbers such as 742 and 81 will in effect be a comparison of 742 and 081 and if the accumulator had six orders the comparison would be between 000742 and 000081.

The complete operation of the comparing devices will now be explained with particular reference to the timing of the various operations. Key contacts 72 are first closed momentarily to complete a circuit from line 16, relay magnet 12, contacts 72 to line 27. Magnet 12 closes its contacts 12b and a holding circuit will follow from line 16, magnet 12, contacts 12b, wire 73, cam contacts 74, to line 27. It may be mentioned here that the several cam contacts shown in Fig. 1a are controlled by suitable cams geared to the accumulator drive shaft 37 (Fig. 2) for synchronous operation therewith and make one revolution for each entering operation of the accumulators. Magnet 12 will also close its contacts 12a which as explained above are connected in the motor circuit of the machine and the circuit may now be completed to operate the motor TM and record cards will be fed to the analyzing mechanism and the data thereon entered in the accumulators in the usual manner.

Cam contacts 74 open momentarily near the end of each cycle of operations of the accumulators and if switches 75, 76 and 77 are open, magnet 12 will be deenergized, opening its contacts 12a to interrupt the motor circuit. Closure of one or more of the switches will cause the comparing circuits to short circuit contacts 74 under predetermined conditions so that the machine may continue in operation.

If switch 76 alone is closed, the machine will stop when the setting of the two accumulators becomes the same. This is brought about as follows: After the entering portion of a cycle, cam contacts 63 close momentarily and if there is no agreement in all the orders, magnet 62 will not be energized as explained above so that upon the subsequent opening of contacts 74 later in the cycle, magnet 12 will be kept energized through a circuit running from line 16, magnet 12, contacts 12b, wire 73, switch 76, contacts 62a, wire 78 to line 27. Upon agreement in the settings of the two accumulators magnet 62 will be energized and its holding circuit will become effective to keep contacts 62a open so that upon opening of contacts 74 there will be no auxiliary holding circuit for magnet 12. Consequently contacts 12a open and the machine will stop.

If switch 75 alone is closed, a holding circuit for magnet 12 will be provided through contacts 60a until the setting of the Acc#1 is less than Acc#2 at which time magnet 60 is energized to open contacts 60a as explained.

If switch 77 alone is closed, a holding circuit for magnet 12 will be provided through contacts 61a until the setting of the Acc#1 is greater than Acc#2.

It will be apparent that if all three switches are closed, the magnet 12 will remain continuously energized and no interruption of the motor circuit will be effected by contacts 12b.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is as follows:

1. In a machine of the class described, a pair of like entry receiving devices, record controlled means for automatically entering items in each of said devices whereby the amount in one device may be equal to or different from the amount in the other device, means responsive to a like setting of said devices, further means responsive to an unlike setting of said devices, and means for selectively causing either of said responsive means to control the operation of the machine.

2. In a machine of the class described, a pair of accumulators, means for effecting entries of items therein, means including a Wheatstone bridge arrangement operative after each item entry for comparing the settings of the two accumulators and means controlled thereby for controlling subsequent machine operation.

3. In a machine of the class described, a pair of accumulator elements, a series of graduated resistances for each, corresponding to the different data representations that may be set in the elements, a pair of fixed resistances, means for connecting said fixed resistances individually to the resistance of each element corresponding to the setting of the elements, in the form of a Wheatstone bridge arrangement, a relay magnet included in a branch of the bridge, a circuit, and means controlled by said magnet for completing said circuit when the resistances of the accumulator elements are of different value.

4. The invention set forth in claim 3 in which a uni-directional current flow device is included in series with the relay magnet in the branch to permit the flow of current in only one direction when the selected resistances are of different values.

5. The invention set forth in claim 3 in which a second relay magnet is connected in parallel with the first named relay magnet and a uni-directional current flow device is included in series with each relay magnet, one uni-directional current flow device permitting flow of current in one direction and the other permitting flow of current in the other direction and a second circuit controlled by said second relay magnet.

6. In a machine of the class described, a pair of accumulators each settable to represent a number, a trio of circuits, comparing means including a Wheatstone bridge arrangement for determining the relationship between the numbers set on the two accumulators and means controlled thereby for completing one of said circuits when the numbers set are alike, the second when the number on one is greater than that on the second and the third when the number on said first one is less than the number on said second one.

7. The invention set forth in claim 6 in which settable means is provided for permitting effective operation of one of said circuits.

ULRICH KÖLM.